United States Patent
Coltel et al.

(10) Patent No.: US 11,489,852 B2
(45) Date of Patent: Nov. 1, 2022

(54) METHOD FOR PROTECTING A PRIVATE COMPUTER NETWORK

(71) Applicant: Alsid, Paris (FR)

(72) Inventors: Romain Coltel, Courbevoie (FR); Luc Delsalle, Paris (FR)

(73) Assignee: Alsid, Paris (FR)

( * ) Notice: Subject to any disclaimer, the term of this patent is extended or adjusted under 35 U.S.C. 154(b) by 344 days.

(21) Appl. No.: 16/801,026

(22) Filed: Feb. 25, 2020

(65) Prior Publication Data

US 2020/0274889 A1  Aug. 27, 2020

(30) Foreign Application Priority Data

Feb. 26, 2019 (FR) ...................... 19 01975

(51) Int. Cl.
*H04L 29/00* (2006.01)
*H04L 9/40* (2022.01)
*H04L 67/1095* (2022.01)
*H04L 61/4552* (2022.01)

(52) U.S. Cl.
CPC ...... *H04L 63/1416* (2013.01); *H04L 61/4552* (2022.05); *H04L 63/1425* (2013.01); *H04L 67/1095* (2013.01)

(58) Field of Classification Search
CPC ............. H04L 63/1416; H04L 61/1552; H04L 63/1425; H04L 67/1095; H04L 41/0631; H04L 41/0681; H04L 43/02; H04L 43/12; H04L 41/0604; H04L 41/069
See application file for complete search history.

(56) References Cited

U.S. PATENT DOCUMENTS

| | | | |
|---|---|---|---|
| 5,862,325 A | 1/1999 | Reed et al. | |
| 7,136,881 B2 * | 11/2006 | Gehman | G06F 9/542 |
| 10,592,546 B2 * | 3/2020 | Schwartz | G06F 16/86 |
| 10,769,278 B2 * | 9/2020 | Chelarescu | G06F 21/566 |
| 2003/0137536 A1 * | 7/2003 | Hugh | G06F 16/273 715/744 |
| 2003/0227487 A1 * | 12/2003 | Hugh | G06F 16/9024 707/E17.011 |
| 2015/0234910 A1 * | 8/2015 | Schiff | G06Q 10/06 707/634 |
| 2017/0032151 A1 * | 2/2017 | Sofia | G06F 21/86 |
| 2017/0060936 A1 * | 3/2017 | Gammans | G06F 16/2365 |
| 2017/0180394 A1 * | 6/2017 | Crofton | G06F 21/64 |
| 2017/0308598 A1 * | 10/2017 | Goldberg | G06F 16/23 |
| 2018/0032997 A1 * | 2/2018 | Gordon | G06Q 30/0269 |
| 2018/0150477 A1 * | 5/2018 | Jewell | G06F 16/1734 |

(Continued)

*Primary Examiner* — Don G Zhao (57) ABSTRACT

The disclosure relates to a method of collecting data from a directory service used to administer a private network comprising a group of interconnected computers (PDS, PC), the directory service collecting data relating to objects in the network, the method comprising the steps of: connecting a terminal (PC) to a network server (PDS) including an instance of the directory service, configuring the instance of the directory service on the server by the terminal, so that the terminal is notified of modifications made to the directory service data, receiving by the terminal notification messages (NTF) containing modified directory service data transmitted by the server, and processing each of the received notification messages to determine the modifications made to the directory service data.

16 Claims, 3 Drawing Sheets

(56) References Cited

U.S. PATENT DOCUMENTS

| | | | | |
|---|---|---|---|---|
| 2018/0239630 A1* | 8/2018 | Buck | ................. | G06F 9/5072 |
| 2018/0293379 A1* | 10/2018 | Dahan | ................. | G06F 21/566 |
| 2019/0260821 A1* | 8/2019 | Crofton | ............... | H04L 67/1097 |
| 2019/0260879 A1* | 8/2019 | Raleigh | ................ | H04M 15/83 |
| 2019/0303573 A1* | 10/2019 | Chelarescu | ......... | H04L 63/1416 |

\* cited by examiner

METHOD FOR PROTECTING A PRIVATE COMPUTER NETWORK

CROSS-REFERENCE TO RELATED APPLICATION

This application is based on and claims priority under 35 U.S.C. § 119 to French Patent Application No. 19 01975 filed on Feb. 26, 2019, in the National Institute of Industrial Property, the disclosure of which is herein incorporated by reference in its entirety.

FIELD

The present disclosure relates to the protection of a private network of interconnected computers. The present disclosure aims in particular at supervising the security of a private network of servers interconnected via private or public data transmission networks, the management tools of such a network being gathered in a directory service using a database to store all the necessary data. This disclosure applies in particular to the Microsoft™ Active Directory services, and Samba.

BACKGROUND

A directory service of this type is intended to provide centralized services for managing a private network of computers, as well as identification and authentication services, allowing access to the private network. It also authorizes the installation of critical updates by designated administrators, to list network items and resources such as user accounts, servers, workstations, shared folders, printers, etc. This makes it easy for a private network user to find shared resources, and administrators can control their use with features for distributing, replicating, partitioning, and securing access to listed resources. All the information necessary for the provision of these services under appropriate security conditions is collected in a database distributed on one or more servers of the private network called "domain controllers". Each controller in the same domain locally stores a copy of the database that can hold a few hundred to several million objects for very large private computer networks.

The database of an "Active Directory" service has a hierarchical structure gathering information on objects such as resource, service, user or group of users. An object is uniquely identified by an identifier and is associated with a set of attributes defining the characteristics and information that the object may contain. The structure of each of the objects stored in the database is defined by a schema object.

In addition, to ensure the consistency of the local copies of the database, stored by the different domain controllers of the private network, the directory service includes replication mechanisms ensuring the transmission and propagation of modifications made in one local copy of the database to the other local copies stored in the private network. This propagation is carried out according to a replication topology where each domain controller can be the center of modifications (addition, modification, deletion) of the database.

The protection of a private network of computers implementing an "Active Directory" directory service is generally ensured upstream by an adequate adjustment of security settings, and downstream by the analysis of event logs produced by domain controllers. Such an analysis requires the activation of advanced logging services on domain controllers, and the implementation of an event redirector ensuring the transmission of the information to be analyzed to a central collection point (a network computer) where the event analysis is performed. Indeed, many security breaches in a private network can be detected as soon as the event occurs if the appropriate event log is activated, the lack of analysis of such logs appears to be a security flaw for many private networks. However, it appears that the volume of safety-related information relative to the total volume of information collected in these logs is extremely unbalanced and therefore unsuitable for the implementation of an effective safety analysis.

Another commonly implemented method of protecting an "Active Directory" service is to install software probes on domain controllers that are configured to collect information about the applications or operating system running on the domain controller. However, such software probes must act at the heart of the domain controller's operating system. They can therefore lead to system malfunctions or generate security breaches that can be exploited by potential attackers.

It is therefore desirable to offer a method of protecting a computer network, capable of effectively and extensively detecting security breaches and attacks, without the risk of disrupting the operation or affecting the security of one of the network's domain controllers.

SUMMARY

Embodiments relate to a method for collecting data from a directory service used to administer a private network comprising a group of interconnected computers, the directory service collecting data relating to objects in the network, the method comprising the steps of: connecting a terminal to a network server including an instance of the directory service, configuring the instance of the directory service on the server from the terminal, so that the terminal is notified of modifications made to the directory service data, receiving by the terminal notification messages containing modified directory service data, transmitted by the server, and processing each notification message received to determine the modifications undergone by the directory service data.

According to an embodiment, the method comprises the steps of: downloading, by the terminal, the directory service data into a local copy managed by the terminal, and each time a notification message is received by the terminal, inserting in the local copy the current value of the modified data conveyed in the notification message.

According to an embodiment, directory service data may be stored in a database managed by the server, one of the notification messages containing a new value of a directory service data item, the method comprising the steps of: comparing the modified data item with a previous value of the modified data item stored in a local copy managed by the terminal, to identify a type of modification, and inserting the new value of the modified data item in the local copy.

According to an embodiment, directory service data may be stored in files managed by the server, one of the notification messages containing a reference to a modified file and a type of modification made to the file, the method comprising the steps of: downloading by the terminal the modified file identified in the notification message, comparing the downloaded file with a previous version of the modified file stored in a local copy managed by the terminal, to identify the modified data in the file, and inserting the downloaded file or modified data from the file into the local copy.

According to an embodiment, the method comprises a step of filtering by the terminal of the directory service data received in order to extract therefrom data relevant for detecting anomalies, wherein only the data thus extracted is stored in the local copy.

According to an embodiment, the method comprises a step of converting directory service data received by the terminal into alphanumeric format or structured data before storing it in the local copy.

Embodiments may also relate to a method of protecting a private network comprising a group of interconnected computers, the network being administered via a directory service collecting directory service data relating to objects in the network, the method comprising the steps of: implementing by a terminal a directory service data collection method such as previously defined, to acquire data from a directory service instance of a server of the network, managing the directory service, storing the acquired directory service data in a local copy managed by the terminal, each time a notification message of a modification of directory service data is received, analyzing by the terminal the modified data against the directory service data stored in the local copy to determine whether a modification applied to the directory service data generates a network security breach or reveals a network attack, and generating an alert message if a security breach or network attack is detected.

According to an embodiment, the analysis of the modified data comprises the steps of: searching in the local copy for a previous value of the modified data, and comparing the current value of the modified data with the previous value of the modified data, wherein an alert message is generated if the comparison reveals the occurrence of a security breach or a network attack.

According to an embodiment, the analysis of modified data comprises the steps of: searching in the local copy for several previous values of the modified data, and comparing the current value of the modified data with the previous values of the modified data, wherein an alert message is generated if the comparison reveals the occurrence of a security breach or an attack on the network.

According to an embodiment, the analysis of modified data comprises the steps of: searching the local copy for a value of at least one data item correlated to the modified data item, and determining whether the current value of the modified data item considered in correlation with the value of the correlated data indicates the occurrence of a security breach or network attack.

According to an embodiment, the network objects comprise servers, user terminals, peripheral devices, users, user groups, services.

Embodiments may also relate to a terminal configured to implement any of the previously defined methods.

Embodiments may also relate to a computer program product directly loadable into an internal memory of a computer and comprising portions of code which, when executed by a computer, configure the computer to perform any of the previously defined method.

BRIEF DESCRIPTION OF DRAWINGS

Exemplary embodiments of the disclosure will be described by way of illustration in the following disclosure with reference to the attached figures, among which.

DETAILED DESCRIPTION

Figure 1:
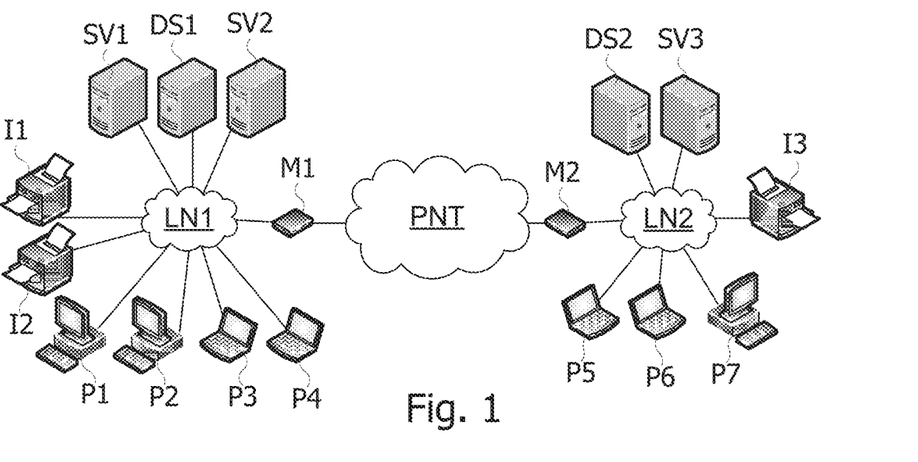
FIG. 1 illustrates an example of a private computer network in which the protection method can be implemented, FIG. 2 schematically represents a software architecture in which the protection method is implemented according to an embodiment.

FIG. 1 is an example of a private computer network in which network collection and protection methods can be implemented. The private computer network comprises one or more domains, each domain comprising one or more servers DS1, DS2 configured to perform a domain controller function, and possibly one or more other servers SV1, SV2, SV3 performing, for example, a file server function. The network also includes terminals P1-P7, peripheral stations I1-I3, such as printers, scanners, etc., and a local network LN1, LN2 interconnecting the servers, terminals and peripheral stations of the domain. Here, the term "terminal" may refer to a personal computer, a workstation, or more generally, equipment capable of connecting to the local network LN1, LN2, capable of communicating with one of the servers DS1, DS2 to transmit, request and receive data, and to process this data.

Two domains of the private network can be interconnected by a public network PNT, each domain being connected to the public network via a gateway or router M1, M2. It should be noted that a single domain may comprise several local private sub-networks interconnected by a public network. Each domain controller DS1, DS2 in the network implements a directory service to manage the domain. Such a directory service implements a database managed using a directory access protocol such as the Lightweight Directory Access Protocol (LDAP). A local copy of the database may be stored by each of the different domain controllers DS1, DS2 on the network. In the case of the Microsoft™ Active Directory service, each domain controller DS1, DS2 on the network stores a local copy of this database, and replication mechanisms are implemented between domain controllers to ensure consistency between the different local copies of this database.

Figure 2:
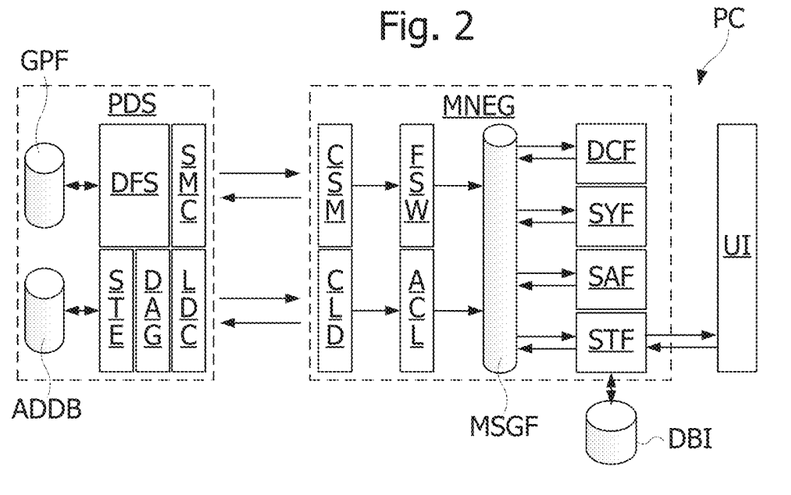

FIG. 2 shows an architecture for implementing the collection and protection methods, according to an embodiment. FIG. 2 shows modules of the directory service implemented by a server PDS, and modules implementing the collection and protection methods, installed on a PC terminal, connected to the server PDS, as a user of the domain controlled by the server PDS. The server PDS may be any of the domain controller servers DS1, DS2, and the terminal can be any of terminals P1-P7.

To provide the directory service, the server PDC comprises an access module STE to a database ADDB of the directory service, a management module DAG of the directory service and a server communication module LDC implementing a directory service access protocol, such as the LDAP protocol. The DAG module organizes and controls access to the database, in particular by providing each of the network users with limited access to part of the database ADDB, relating to a single organizational unit to which the user belongs. Some users, belonging to a group of administrators, have full access to the database.

In the case of the Microsoft™ Active Directory service, the module STE is a software library that gathers database manipulation functions according to the indexed sequential access method, and implements mechanisms to perform atomic, consistent, isolated and durable transactions, as well as cache, lock and logging mechanisms to ensure the security and efficiency of operations performed on the database ADDB.

The ADDB database presents a hierarchical organization of objects that can be classified into three main categories: resources (e.g. printers), services (e.g. e-mail) and users (user accounts and groups). Each object in the object database represents a unique entity (for example, a user, computer, printer, or group), and collects information about the object, such as attributes. Some of these objects can also be containers or complementary technical elements for other objects. An object is uniquely identified in the database by its name and has its own set of attributes representing the characteristics and information that the object may contain. The structure of each object is defined by a schema that also determines the object type, where the schemas for the objects are also stored in the database ADDB.

The number of object types available in the database ADDB is not limited. For example, the database ADDB can contain objects of the following types:

Organizational unit (containers that create a hierarchy of objects within an area; organizational units are mainly used to enable delegation of rights and to apply group policies to all objects in the organizational unit), computer (server, terminal, workstation, . . . ), user, group (mainly used to establish lists of users in order to assign them the same set of rights and/or services).

According to an embodiment, an application MNEG for monitoring the directory service is installed and executed by the PC terminal, this application being connected and communicating with the server PDS via the network and the module LDC to receive modification events of the database ADDB. For this purpose, the monitoring application MNEG includes a client communication module CLD implementing the directory service access protocol of the server PDS (e.g. LDAP protocol) to communicate with the module LDC of the server PDS, a module ACL for detecting modifications in the ADDB database based on the data received by the module CLD, a filtering and decoding module DCF, a synchronization module SYF, an analysis module SAF, an storage module STF, and a communication module MSGF allowing the ACL, DCF, SYF, SAF and STF modules to communicate with each other.

The client communication module CLD implements a protocol for accessing the directory service of the server PDS (e.g. LDAP), and configures a search command in the directory service implemented by the LDC and DAG modules, to be notified of any modifications to the contents of the database ADDB, to receive these notifications, and to determine the modified data based on these notifications. The ACL module formats the modified data items and transfers them as messages to the communication module MSGF, in order to have them processed successively by the DCF, SYF, SAF and STF modules.

During an initialization phase, the CLD module also downloads an image of the ADDB database. The downloaded data is also formatted and transferred by the ACL module to the communication module MSGF for processing by the DCF, SAF and STF modules. The formatting performed by the ACL module, applied to the data downloaded and received in the notifications, may consist in serializing the data relating to the objects in the ADDB database and converting them into a textual format, for example JSON (JavaScript Object Notation), associating labels corresponding to names of object types and attributes, and to values corresponding to the names and values of the objects and attributes.

The decoding module DCF filters the data to retain only those data items identified as useful for security analysis and translates into text or alphanumeric characters some of the possible binary data items contained in the useful data provided by the ACL module. These processes are also applied to the ADDB data collected during the initialization phase.

The synchronization module SYF temporally reorders the messages from the decoding module DCF. This is because some messages generated by the ACL module may not be produced or received in chronological order, so that a modification in the ADDB database resulting from another modification is processed by the ACL module before that other modification. The SYF module can be based on timestamping performed by the CSM module, which assigns a date and time of receipt to each notification received.

The analysis module SAF individually analyzes each modification to the ADDB database, by the synchronization module SYF, to determine if the modification may affect the security of the computer network or may indicate an attack. If the modification has the potential to compromise the security of the network, the SAF module generates an alert message containing the data related to the modification and possibly a criticality rate of the modification with respect to the security of the network. The alert message may be transmitted to a user interface or stored in an event log. This analysis is also applied to the ADDB data collected during the initialization phase. All data processed by the SAF module is stored in the local DBI database by the STF module. Thus, the local DBI database contains an image of the ADDB database collected during the initialization phase, and filtered by the DCF module, as well as all the updates of the filtered objects, performed on the ADDB database and notified to the CLD module. The data in the DBI database is in alphanumeric format or other well-identified structured format (for example, date format), including the values of objects and object attributes found in the database.

According to an embodiment, the analysis performed by the SAF analysis module includes, at least for certain types of modified data, searching the DBI database for a previous version of the modified data to determine whether the modification may affect the security of the network.

According to an embodiment, the MSGF communication module manages an input buffer for each of the DCF, SYF, SAF and STF modules, in which it inserts the data to be processed by the module. Each of the DCF, SYF, SAF and STF modules retrieves the oldest data from its buffer for processing. Each time a data item is processed by a module, the processed data item is inserted into the buffer of the next module that processes the data item. Each time one of the modules DCF, SYF, SAF and STF finishes processing a data item, it processes the next oldest data item in its buffer memory. This allows the DCF, SYF, SAF and STF modules to operate completely asynchronously with respect to each other. In addition, this arrangement allows several instances of the same module to run simultaneously if the processing capacity of the module is insufficient with respect to the rate of arrival of new data to be processed in its buffer. Thus, a new instance of one of the modules DCF, SYF, SAF and STF can be activated as soon as data to be processed by this module appears in its buffer, this instance being deactivated at the end of the data processing.

The PC terminal may include a user interface module UI configured to access alert messages issued by the SAF analysis module, and generate alarms based on the criticality indices associated with the messages. The UI can also be configured to display these alarms or transmit them to other entities, for example via e-mail, or via an interface (e.g. an API—Application Programming Interface) to another system, for example a SIEM system (Security Information And Event Management). It should be noted that the UI may be located on other equipment capable of receiving and processing the alert messages issued by the SAF module.

The Microsoft™ Active Directory service also stores data in GPF files that gather objects that define group policies. Group policies control access to a computer's data, security and audit policy, software installation, login and logout scripts, folder redirection, and Internet browsing settings. Each group strategy can be associated with an area, site or organizational unit. Thus, multiple computer or user objects can be controlled by a single group policy. Group policies are analyzed and applied each time a computer is started and during a user session. The ADDB database includes group policy objects that link GPF files to computers and users in the domain. GPF files are managed by a distributed file system DFS, and are made accessible outside the PDS server by an SMC access module implementing the SMB (Server Message Block) protocol.

According to an embodiment, the monitoring application MNEG includes a client communication module CSM to communicate with the SMC module of the PDS server, and an FSW module to receive and pre-process GPF file modification notifications received and transmitted by the CSM module. The CSM module implements the protocol for accessing GPF files stored by the PDS server (e.g. SMB protocol). During an initialization phase, the SMC module orders the download of the GPF files stored by the PDS server, and transmits commands to the SMC module to be notified of any modifications made to the GPF files on the PDS server.

The FSW module ensures the download of GPF files during the initialization phase, and of modified GPF files specified in the notifications received. The FSW module also formats the downloaded files and transfers them to the MSGF communication module for successive processing by the DCF, SYF, SAF and STF modules. The formatting performed by the FSW module may include serializing the data contained in the GPF files, and converting them into the same text format as that used by the ACL module.

Figure 3:
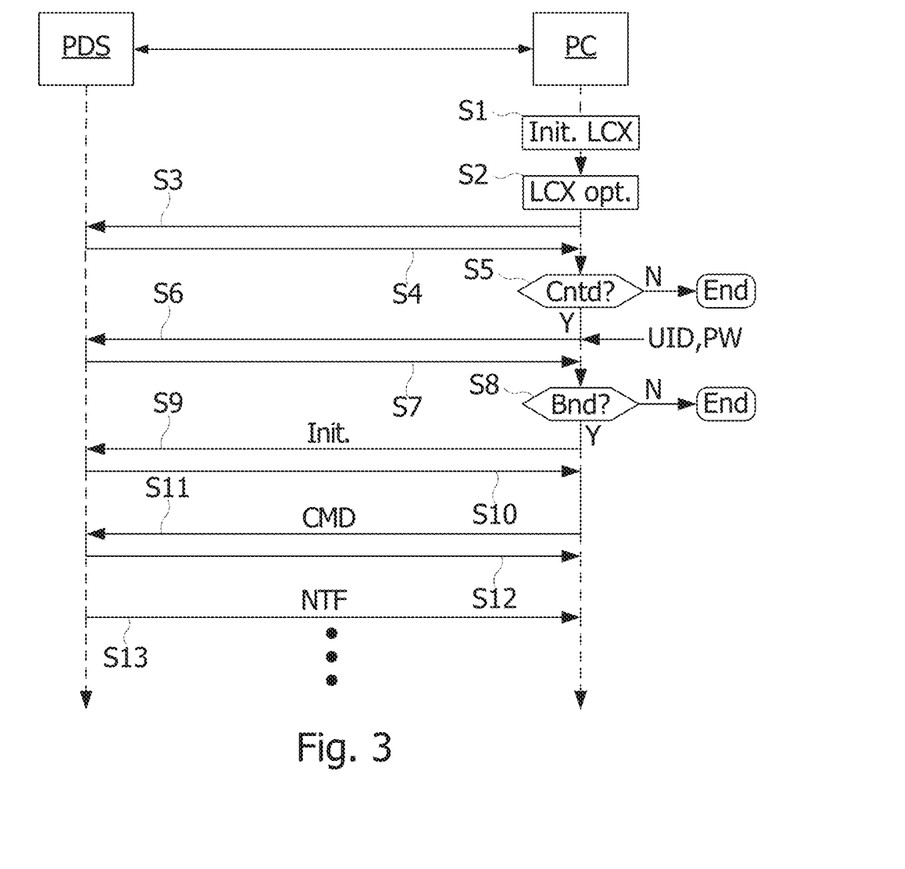
FIG. 3 illustrates the steps of a procedure for collecting events appearing in a directory service, according to an embodiment.

FIG. 3 shows steps S1 to S13 of a procedure for configuring and collecting notifications for modifications occurring in the directory service, according to an embodiment. Steps S1 to S13 are carried out successively by the CLD and LDC modules. In step S1, the CLD module of the PC terminal performs initialization operations for a connection to the PDS server. This step allows in particular to enter a PDS server identifier. In step S2, the CLD module defines connection options that define how the connection will be established and how the connection will proceed. In step S3, the CLD module issues a connection command to the designated PDS server when initiating the connection. The purpose of this connection command is to determine a communication protocol to be used for communication. If the connection is established, in step S4, the SMC module on the PDS server provides a response to the connection command. In step S5, the CLD module tests a connection establishment indicator with the PDS server. If the connection is not established, the procedure ends or is executed again from step S1. Otherwise, step S6 is carried out. In step S6, the CLD module attempts to authenticate itself to the PDS server by providing authentication data, e.g. a login UID and password PW. During this step, the PDS server executes an authentication procedure asking the PC terminal to provide UID, PW authentication data. At the end of this procedure, the PDS server provides the result of the authentication. In step S8, the procedure ends if the authentication result is negative, or continues in step S9 otherwise. In step S9, the CLD module sends LDAP compliant commands to the PDS server to collect an image from the ADDB database. In step S10, the LDC module on the PDS server transmits all the objects stored in the ADDB database. In step S10, the CLD module receives and processes the received objects and then transmits them to the MSGF module. In step S11, the CLD module sends LDAP-compliant commands CMD to the PDS server to configure the PDS server to notify the PC terminal of any modifications made to the ADDB database. In step S12, the PDS server transmits a message acknowledging receipt of these commands to the PC terminal. The next step S13 is carried out each time a modification is made in the ADDB database. At this stage, the PDS server transmits to the PC terminal a notification message NTF containing modified data, corresponding to the commands CMD issued at step S11.

The CMD commands issued in step S11 define options and filters for finding objects in the ADDB database. The filters and search options selected set up an asynchronous search in which any modification applied to any object in the ADDB database, including a deletion of an object, is subject to the transmission of an NTF notification (step S12) by the PDS server to the PC terminal. The data contained in the NTF notification messages (steps S13) can be in LDIF (LDAP Data Interchange) format.

Figure 4:
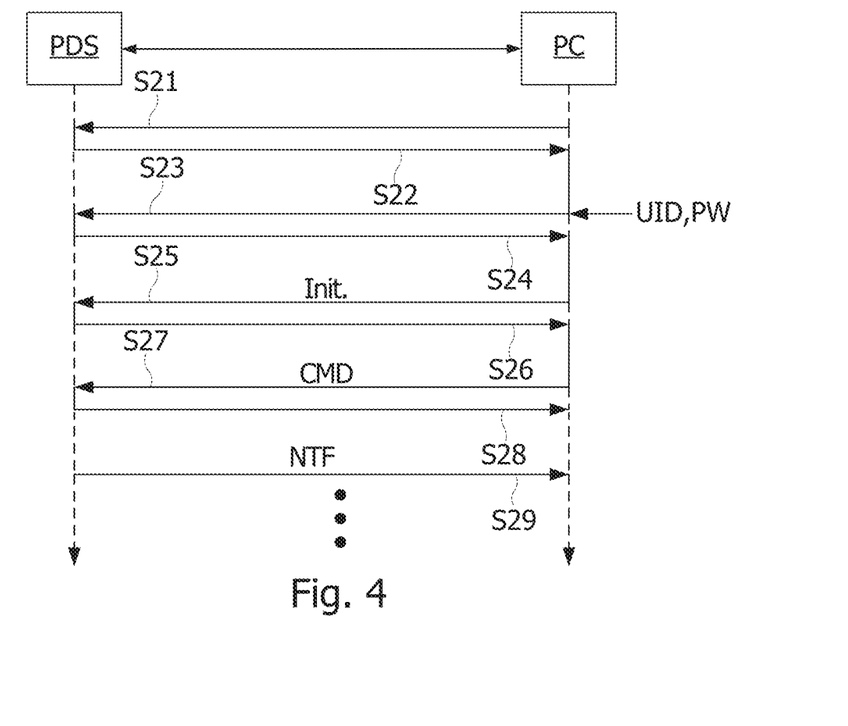
FIG. 4 illustrates the steps of a procedure for collecting events appearing in a directory service in an alternative manner.

FIG. 4 shows steps S21 to S29 of a procedure for collecting and pre-processing events relating to modifications in GPF files, according to an embodiment. Steps S21 to S29 are executed successively by the CSM module on the PC terminal and SMC module on the PDS server. In step S21, the CSM module connects to the PDS server by sending a negotiation command to determine the communication protocols that can be used for communication. In step S22, the SMC module on the PDS server provides a response to the negotiation command. In step S23, the SMC module transmits a command to the SMC module to establish a communication session that triggers an authentication procedure for the user running the MNEG monitoring application. In step S24, the SMC module provides a response to the session establishment command. The following steps S25 to S29 are executed only if the authentication is successful. In step S25, the CSM module transmits a command to download the GPF files stored by the PDS server. These files are received in step S26 and then pre-processed by the FSW module.

In step S27, the CSM module transmits a command CMD to the SMC module specifying GPF files to be monitored, e.g. in the form of one or more file folder paths, and modification events occurring in these files. These events may involve a modification in the size, creation date, date of last write, file or folder name in which the file is located, or deletion of one of the GPF files. In step S28, the SMC module responds to the command CMD issued in step S25 by sending an acknowledgment message. Responses from the SMC module in steps S22, S24, S26 and S28 may indicate an error. In this case, the CSM module terminates the procedure or executes the previous command again, or resumes the procedure from step S21.

Each time a modification of one of the specified types is made in one of the GPF files specified in the command CMD transmitted in step S27, the SMC module transmits to the CSM module a notification message NTF containing a modified data type or a modification type, together with the modified GPF file or the modified elements in this file or simply the path to this file (step S29).

The information contained in each notification message NTF is processed by the FSW module to generate a message containing the modified data, which is transmitted to the MSGF module. If the NTF notification message received from the PDS server simply indicates the name or path to the modified GPF file, the FSW module accesses the file on the PDS server, through a file sharing process, and formats the data in the file by locating the various fields in the file, assigning a textual name to each of the fields so located. The file thus modified is then processed successively by the DCF, SYF and SAF modules.

The DCF decoding module filters the data useful for security analysis and transcribes any binary data contained in the user data of the files supplied by the FSW module into text or alphanumeric characters. These processes are also applied to the GPF files collected during the initialization phase.

Like previously for the ADDB data, the SAF module compares the data in the file provided by the SYF module, including metadata, with the previous version of the file stored in the DBI database (if applicable the one acquired in step S26) to locate and then extract the modified data from this file, and applies different security flaw detection algorithms to each modified data item depending on the type of the modified data. If a security breach is detected in this way, the SAF module generates an alert message containing the data relating to the modification and possibly a criticality index of the modification with respect to the security of the network. As before, the alert message can be transmitted to the UI or stored in an event log. This analysis is also applied to the GPF files collected during the initialization phase. All data processed by the SAF module is then stored in the local DBI database by the STF module. Thus, the local DBI database contains an image of the GPF files, collected during the initialization phase, the contents of these files being filtered by the DCF module, as well as all the updates of the filtered files, applied to the GPF files of the PDS server and notified to the CSM module during the steps S29.

In this way, the implementation of ADDB data collection and security flaw and attack detection functions does not require the installation of software agents on the PDS server. Furthermore, once a copy of the ADDB database has been transmitted to the PC terminal during an initialization phase, only the modified data is transmitted between the PDS server and the PC terminal, which limits the flow of data transmitted over the network to what is necessary for the detection of attacks. In addition, the functions for configuring notifications of modifications of the directory service data allow the PC terminal to be informed in real time of all modifications to the directory service, unlike the use of logs that can be generated by the directory service. It can also be observed that these notification functions do not require administrator-level access rights, as only the access rights of a simple user are required to allow the PC terminal to access the directory service data relevant for security analyses on the PDS server.

According to an embodiment, the SAF module includes a specific analysis function per type of event or data modified, and a function that receives a type of event or data to be processed and calls the analysis function corresponding to the type of event or data received.

According to an embodiment, the SAF module may be configured to analyze security parameters stored in the ADDB database or in GPF files and to issue an alert message when one of these parameters is set to a value that introduces a security breach. These security settings may include the authentication methods used to authenticate the different user groups in the PDS server domain, the rules for choosing passwords, the access rights assigned to different user groups, and the access rights assigned to files listed as sensitive.

To process certain types of data, the SAF module may be configured to compare the current value of a modified data item with the previous value of that data item stored in the local DBI database, and generate an alert message if this comparison may reveal a security breach or network attack.

To process certain other types of data in order to detect a security breach or a network attack, the SAF module may be configured to compare the current value of a modified data item with a number of previous values of that data item, stored in the local DBI database.

To process certain other types of data in order to detect a security breach or a network attack, the SAF module may be configured to search for a correlation between the current value of a modified data item and the value of one or more other data items in the local DBI database. This correlation may take into account several previous values of the data under consideration and/or take into account an elapsed time between the last modification of the data under consideration.

When the PC terminal receives a notification of data deleted from the ADDB database or of the deletion of one of the GPF files, the deleted data or the data in the deleted file is stored in the local DBI copy at a specific value representing the deleted status.

For example, the SAF module can be configured to detect the presence of cleartext or reversibly encoded passwords in a GPF file. Indeed, a GPF file may contain user-defined data, and it is common for a network administrator to use this possibility to review confidential data such as passwords, since the presence of such weak passwords may constitute a security breach for the network. This allows the SAF module to be configured to process a GPF file creation or modification event by searching the created or modified file for the presence of a cleartext or reversibly encoded password, for example by applying a heuristic method, and to generate an alert message if the file is likely to contain a cleartext password.

The DAG module may record in the ADDB database a number of erroneous login attempts to a user account. The SAF module may be configured to analyze this type of event and assign a high criticality index if the number of erroneous attempts exceeds a certain threshold value. The SAF module may also correlate this event with other identical events on the same user account by analyzing the messages previously stored in the DBI storage device to evaluate the criticality index to be assigned to the event.

The DAG module may record in the ADDB database a modification of the access rights to a file or of the access rights assigned to a user or a computer on the network. The SAF module may be configured to analyze this type of event and assign a high criticality rating if this modification of access rights, for example, assigns a user with no administrator rights access to a protected file that is initially restricted to network administrators, or extends the user or computer's access rights.

According to an embodiment, the DAG module may be configured to store in the ADDB database the software configurations of all computers and servers in the PDS server domain. The SAF module may then be configured to scan the software configurations of the domain computers and servers stored in the ADDB database and to issue an alert message when one of the computers is running an obsolete version of the operating system or application, or when the operating system or application does not have the latest security patches.

According to an embodiment, the SAF module may be configured to search for dormant user accounts or for dormant user accounts with high access privileges.

It shall be clear to a person skilled in the art that the present disclosure is susceptible of various variations in execution and various applications. In particular, the establishment of a service for notification of modifications in directory service data is not limited to the detection of attacks against the directory service, but may also be used for archiving such modifications or for statistical analyses applied to such modifications, including the reconstruction of a local copy of the directory service data. In this case, the DCF decoding module need not perform any filtering of the directory service data received from the PDS server.

In addition, other methods can be used to detect modifications in a directory service. For example, a copy of the directory service data can be acquired periodically, and a comparison with the previous copy can be made to detect any modifications that have occurred since the previous copy was made. At the end of the comparison, the previous copy is replaced by the last copy of the directory service data, or only the modified data is added to the original copy. Each modification detected in this way can then be treated individually as if it had been the result of a notification of a modification in the directory service data.

What is claimed is:

1. A method for monitoring data on a server in a private network comprising a group of interconnected computers, the method comprising the steps of:
    running on the server a directory service managing data relating to network objects, the network objects including access and security policies, wherein the directory service is controllable through a directory access protocol,
    connecting a terminal to the server,
    configuring the directory service on the server from the terminal using the directory access protocol, such that the directory service notifies the terminal of modifications made to the directory service data,
    receiving, by the terminal, notification messages containing modified directory service data, transmitted by the server, and
    processing each notification message received to determine the modifications undergone by the directory service data.

2. The method according to claim 1, comprising the steps of:
    downloading, by the terminal, the directory service data into a local copy managed by the terminal, and
    each time a notification message is received by the terminal, inserting in the local copy a current value of the modified data conveyed in the notification message.

3. The method according to claim 1, wherein the directory service data is stored in a database managed by the server, one of the notification messages containing a new value of a directory service data item, the method comprising the steps of:
    comparing the modified data with a previous value of the modified data stored in a local copy managed by the terminal, to identify a type of modification, and
    inserting the new value of the data item in the local copy.

4. The method according to claim 1, wherein directory service data is stored in files managed by the server, one of the notification messages containing a reference to a modified file and a type of modification made to the file, the method comprising the steps of:
    downloading by the terminal the modified file identified in the notification message,
    comparing the downloaded file with a previous version of the modified file stored in a local copy managed by the terminal, to identify the modified data in the file, and
    inserting the downloaded file or modified data from the file into the local copy.

5. The method according to claim 2, comprising a step of filtering by the terminal of the directory service data received in order to extract therefrom data relevant for detecting anomalies, wherein only the data thus extracted is stored in the local copy.

6. The method according to claim 2, comprising a step of converting directory service data received by the terminal into alphanumeric format or structured data before storing it in the local copy.

7. The method according to claim 1, wherein the network objects comprise servers, user terminals, peripheral devices, users, user groups, or services.

8. A method of protecting a private network comprising a group of interconnected computers, the method comprising the steps of:
    running on a server a directory service managing data relating to network objects, the network objects including access and security policies, wherein the directory service is controllable through a directory access protocol,
    acquiring data from the directory service, the acquiring comprising:
        connecting a terminal to the server,
        configuring the directory service on the server from the terminal using the directory access protocol, such that the directory service notifies the terminal of modifications made to the directory service data,
        receiving, by the terminal, notification messages containing modified directory service data, transmitted by the server, and
        processing each notification message received to determine the modifications undergone by the directory service data;
    storing the acquired directory service data in a local copy managed by the terminal,
    each time a notification message of a modification of directory service data is received, analyzing by the terminal the modified data against the directory service data stored in the local copy to determine whether a modification applied to the directory service data generates a network security breach or reveals a network attack, and
    generating an alert message if a security breach or network attack is detected.

9. The method according to claim 8, wherein analyzing the modified data comprises the steps of:
    searching in the local copy for a previous value of the modified data, and
    comparing a current value of the modified data with the previous value of the modified data, wherein an alert message is generated if the comparison reveals an occurrence of a security breach or a network attack.

10. The method according to claim 9, wherein analyzing the modified data comprises the steps of:
   searching in the local copy for several previous values of the modified data, and
   comparing the current value of the modified data with the previous values of the modified data, wherein an alert message is generated if the comparison reveals the occurrence of a security breach or an attack on the network.

11. The method according to claim 10, wherein analyzing the modified data comprises the steps of:
   searching the local copy for a value of at least one data item correlated to the modified data, and
   determining whether the current value of the modified data considered in correlation with the value of the correlated data indicates the occurrence of a security breach or network attack.

12. A method for collecting data from a directory service used to administer a private network comprising a group of interconnected computers, the directory service collecting data relating to objects in the network, the method comprising the steps of:
   connecting a terminal to a network server including an instance of the directory service;
   downloading, by the terminal, the directory service data into a local copy managed by the terminal;
   configuring the instance of the directory service on the server from the terminal, so that the terminal is notified of modifications made to the directory service data;
   receiving, by the terminal, notification messages containing modified directory service data, transmitted by the server;
   each time a notification message is received by the terminal:
      converting the directory service data conveyed in the notification message into alphanumeric format or structured data, and
      inserting the converted directory service data in the local copy; and
   processing each notification message received to determine the modifications undergone by the directory service data.

13. The method according to claim 12, wherein the directory service data is stored in a database managed by the server, one of the notification messages containing a new value of a directory service data item, the method comprising the steps of:
   comparing the modified data with a previous value of the modified data stored in a local copy managed by the terminal, to identify a type of modification, and
   inserting the new value of the data item in the local copy.

14. The method according to claim 12, wherein directory service data is stored in files managed by the server, one of the notification messages containing a reference to a modified file and a type of modification made to the file, the method comprising the steps of:
   downloading by the terminal the modified file identified in the notification message,
   comparing the downloaded file with a previous version of the modified file stored in a local copy managed by the terminal, to identify the modified data in the file, and
   inserting the downloaded file or modified data from the file into the local copy.

15. The method according to claim 12, comprising a step of filtering by the terminal of the directory service data received in order to extract therefrom data relevant for detecting anomalies, wherein only the data thus extracted is stored in the local copy.

16. The method according to claim 12, wherein the network objects comprise servers, user terminals, peripheral devices, users, user groups, or services.

* * * * *